(12) United States Patent
Zhang et al.

(10) Patent No.: US 9,411,634 B2
(45) Date of Patent: Aug. 9, 2016

(54) ACTION FRAMEWORK IN SOFTWARE TRANSACTIONAL MEMORY

(75) Inventors: Lingli Zhang, Sammamish, WA (US);
Yosseff Levanoni, Redmond, WA (US);
David L. Detlefs, Issaquah, WA (US);
Sukhdeep S. Sodhi, San Jose, CA (US);
Weirong Zhu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 712 days.

(21) Appl. No.: 12/819,494

(22) Filed: Jun. 21, 2010

(65) Prior Publication Data

US 2011/0314230 A1    Dec. 22, 2011

(51) Int. Cl.
*G06F 17/30*    (2006.01)
*G06F 9/46*    (2006.01)
*G06F 9/52*    (2006.01)

(52) U.S. Cl.
CPC ............ *G06F 9/467* (2013.01); *G06F 9/526* (2013.01)

(58) Field of Classification Search
CPC ......... G06F 12/0253; G06F 8/20; G06F 8/30; G06F 8/10; G06F 8/34; G06F 17/30008; G06F 9/526; G06F 9/52; G06F 9/466; G06F 17/30067; G06Q 10/10
USPC ............................ 707/609, 813, 704; 717/100
See application file for complete search history.

(56) References Cited

U.S. PATENT DOCUMENTS

| | | | |
|---|---|---|---|
| 5,237,673 A * | 8/1993 | Orbits et al. | 711/170 |
| 6,240,413 B1 | 5/2001 | Learmont | |
| 6,360,228 B1 * | 3/2002 | Sundara et al. | |
| 7,120,762 B2 | 10/2006 | Rajwar et al. | |
| 7,206,805 B1 * | 4/2007 | McLaughlin, Jr. | 709/203 |
| 7,289,992 B2 | 10/2007 | Walker | |
| 7,434,010 B2 | 10/2008 | Duffy et al. | |
| 7,478,210 B2 * | 1/2009 | Saha et al. | 711/159 |

(Continued)

FOREIGN PATENT DOCUMENTS

| | | |
|---|---|---|
| CN | 1139489 | 1/1997 |
| CN | 101432702 | 5/2009 |

(Continued)

OTHER PUBLICATIONS

Bratin Saha et al., McRt-STM: A High Performance Software Transactional Memory System for a Multi-core Runtime,Mar. 2006, ACM, pp. 187197.*

(Continued)

*Primary Examiner* — Cam-Y Truong
(74) *Attorney, Agent, or Firm* — Kevin Sullivan; Aaron Hoff; Micky Minhas

(57) ABSTRACT

A software transactional memory system implements a lightweight key-based action framework. The framework includes a set of unified application programming interfaces (APIs) exposed by an STM library that allow clients to implement actions that can be registered, queried, and updated using specific keys by transactions or transaction nests in STM code. Each action includes a key, state information, and a set of one or more callbacks that can be hooked to the validation, commit, abort, and/or re-execution phases of transaction execution. The actions extend the built-in concurrency controls of the STM system with customized control logics, support transaction nesting semantics, and enable integration with garbage collection systems.

19 Claims, 4 Drawing Sheets

(56) References Cited

U.S. PATENT DOCUMENTS

| | | | |
|---|---|---|---|
| 8,060,482 B2* | 11/2011 | Wang et al. | 707/703 |
| 2005/0086446 A1* | 4/2005 | McKenney et al. | 711/163 |
| 2006/0085591 A1 | 4/2006 | Kumar et al. | |
| 2007/0130238 A1* | 6/2007 | Harris et al. | 707/206 |
| 2007/0198521 A1 | 8/2007 | McKenney | |
| 2009/0006404 A1 | 1/2009 | Magruder et al. | |
| 2009/0037417 A1 | 2/2009 | Shankar et al. | |
| 2009/0077082 A1 | 3/2009 | Magruder et al. | |
| 2009/0125519 A1* | 5/2009 | Robison et al. | 707/999.008 |
| 2009/0165006 A1* | 6/2009 | Ceze et al. | 718/102 |
| 2009/0187599 A1 | 7/2009 | Bruso et al. | |
| 2009/0235254 A1 | 9/2009 | Michael | |
| 2010/0058338 A1* | 3/2010 | Schneider | 718/1 |
| 2010/0058362 A1 | 3/2010 | Cownie et al. | |
| 2010/0332538 A1* | 12/2010 | Gray et al. | 707/774 |
| 2011/0246725 A1 | 10/2011 | Moir et al. | |
| 2011/0314230 A1* | 12/2011 | Zhang et al. | 711/154 |
| 2011/0314244 A1 | 12/2011 | Sodhi et al. | |
| 2012/0158684 A1 | 6/2012 | Lowenstein et al. | |
| 2012/0173499 A1 | 7/2012 | Walker | |
| 2013/0297967 A1 | 11/2013 | Heller, Jr. | |

FOREIGN PATENT DOCUMENTS

| | | |
|---|---|---|
| CN | 101510162 | 8/2009 |
| CN | 101542437 A | 9/2009 |

OTHER PUBLICATIONS

Bai, et al., "A Key-based Adaptive Transactional Memory Executor", Retrieved at <<http://www.cs.wm.edu/~xshen/Publications/nsfngs07.pdf>>, 21th International Parallel and Distributed Processing Symposium (IPDPS 2007), Mar. 26-30, 2007, pp. 1-8.

Dice, et al., "Understanding Tradeoffs in Software Transactional Memory", Retrieved at <<http://www.cs.tau.ac.il/~shanir/nir-pubs-web/Papers/Understanding.pdf >>, Proceedings of the International Symposium on Code Generation and Optimization 2007, Mar. 11-14, 2007, pp. 13.

".Net Framework 4 Beta 1 Enabled to Use Software Transactional Memory (STM.NET Version 1.0)", Retrieved at <<http://download.microsoft.com/download/9/5/6/9560741A-EEFC-4C02-822C-BB0AFE860E31/STM_User_Guide.pdf>>, Jul. 24, 2009, pp. 1-84.

Yen, et al., "LogTM-SE: Decoupling Hardware Transactional Memory from Caches", Retrieved at <<007 http://www.cs.wisc.edu/multifacet/papers/hpca07_logtmse.pdf >>, Proceedings of the 2007 IEEE 13th International Symposium on High Performance Computer Architecture, 2007, Feb. 10-14, 2007, pp. 12.

Gottschlich, et al., "An Efficient Lock-Aware Transactional Memory Implementation", Retrieved at <<http://ce.colorado.edu/Publications/icooolps09-latm.pdf >>, Proceedings of the 4th workshop on the Implementation, Compilation, Optimization of Object-Oriented Languages and Programming Systems, 2009, Jul. 6-6, 2009, pp. 8.

McDonald, et al., "Transactional Memory: The Hardware-Software Interface", Retrieved at <<http://csl.stanford.edu/~christos/publications/2007.hwswtm.ieeemicro.pdf>>, IEEE Micro, vol. 27, Issue 1, Jan. 2007, pp. 67-76.

Office Action for U.S. Appl. No. 12/819,499 mailed Apr. 30, 2012 (9 pages).

Final Office Action for U.S. Appl. No. 12/819,499 mailed Aug. 28, 2012 (7 pages).

Notice of Allowance for U.S. Appl. No. 12/819,499 dated Dec. 23, 2013 (29 pgs.).

* cited by examiner

ACTION FRAMEWORK IN SOFTWARE TRANSACTIONAL MEMORY

CROSS REFERENCE TO RELATED APPLICATION

This application is related to co-owned and co-pending U.S. patent application Ser. No. 12/819,499, which is entitled "COMPOSITION OF LOCKS IN SOFTWARE TRANSACTIONAL MEMORY", filed Jun. 21, 2010, and is incorporated by reference in its entirety.

BACKGROUND

Computer programs may be written to allow different portions of the program to be executed concurrently using threads or another suitable concurrent execution mechanism. In order to execute different portions of the program concurrently, the computer system or the program typically includes some mechanism to manage the memory accesses of the different portions to ensure that the parts access common memory locations in the desired order.

Transactional memory systems allow programmers to designate transactions in a program that may be executed as if the transactions are executing in isolation (i.e., independently of other transactions and other non-transactional sequences of instructions in the program). Transactional memory systems manage the memory accesses of transactions by executing the transactions in such a way that the effects of the transaction may be rolled back or undone if two or more transactions attempt to access the same memory location in a conflicting manner. Transactional memory systems may be implemented using hardware and/or software components.

Transactional memory systems, such as software transactional memory (STM) systems, often have limitations on the types of programming scenarios that are supported. For example, STM systems do not typically support the use of thread local memory in transactions, the interoperation between transactional and traditional locks, the use of static class initializers and modular initializers, the use of software lock elision inside transactions, and the use of a customized abstract concurrency control. While developers of STM systems may be able to implement separate solutions for each of the above scenarios as well as other scenarios, separate solutions may be costly and may result in an undesirable architecture of an STM system. An STM system with a unified and efficient solution that allows a wide range of programming scenarios to be supported would be desirable.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A software transactional memory (STM) system implements a lightweight key-based action framework. The framework includes a set of unified application programming interfaces (APIs) exposed by an STM library that allow clients (e.g., programmers and/or compilers) to implement actions that can be registered, queried, and updated using specific keys by transactions or transaction nests in STM code. Each action includes a key, state information, and a set of one or more callbacks that can be hooked to the validation, commit, abort, and/or re-execution phases of transaction execution. The actions extend the built-in concurrency controls of the STM system with customized control logics, support transaction nesting semantics, and enable integration with garbage collection systems. The STM system may use the action framework to solve one or more of STM programming scenarios with uniformity and efficiency.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
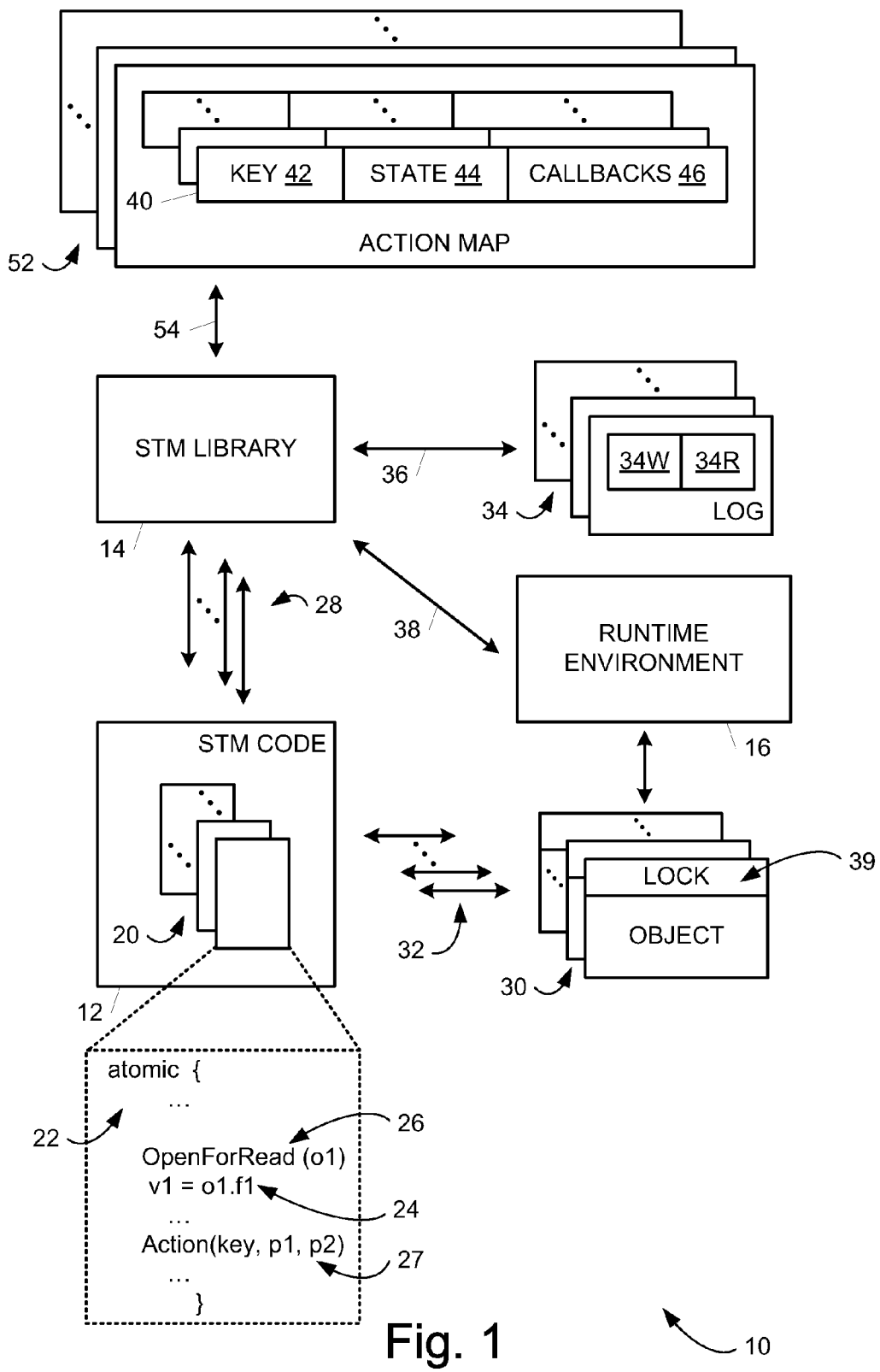
FIG. 1 is a block diagram illustrating an embodiment of a software transactional memory system.

FIG. 1 is a block diagram illustrating an embodiment of a software transactional memory (STM) system 10. STM system 10 represents a runtime mode of operation in a computer system, such as computer system 100 shown in FIG. 5 and described in additional detail below, where the computer system is executing the instructions of STM code 12. STM system 10 implements a lightweight key-based action framework as described in additional detail below.

STM system 10 includes an STM library 14 and a runtime environment 16 for executing STM code 12. STM system 10 is configured to manage the execution of STM transactions 20 that form atomic blocks in STM code 12 to allow transactions 20 to be executed atomically and, if desired, rollback or undo changes made by transactions 20. To do so, STM system 10 tracks memory accesses by transactions 20 to objects 30 using a log 34 for each executing transaction 20 as indicated by an arrow 36.

Runtime environment 16 may be any suitable combination of runtime libraries, a virtual machine (VM), operating system (OS) functions, such as functions provided by an OS 122 shown in FIG. 5 and described in additional detail below, and/or compiler functions, such as functions provided by compiler 92 shown in FIGS. 4 and 5 and described in additional detail below.

STM code 12 includes a set of one or more transactions 20 and any suitable non-transactional code. Each transaction 20 includes a sequence of instructions that is designed to execute atomically, i.e., as if the sequence is executing in isolation from other transactional and non-transactional code in STM code 12. Each transaction 20 includes an atomic block designator 22 or other suitable syntax that indicates that a corresponding portion of STM code 12 is a transaction 20. Transactions 20 also include invocations 26 of STM primitives, which may be added by a compiler such as a compiler 92 shown in FIGS. 4 and 5 and described in additional detail below, that call functions in STM library 14. The STM primitives of STM library 14 return results to transactions 20 as indicated by function calls and returns 28. In addition, each transaction 20 includes zero or more memory accesses 24 that read from and/or write to one or more objects 30 as indicated by arrows 32 and/or one or more statics (not shown).

STM code 12 may include one or more nested transactions in the set of transactions 20. A nested transaction is a transaction 20 that is invoked by another transaction 20, i.e., a parent transaction. The parent transaction and any transactions 20 that are invoked by the parent transaction or stem from an invocation from the parent transaction form a transaction nest.

STM library 14 includes STM primitives and instructions executable by the computer system in conjunction with runtime environment 16 to implement STM system 10. The STM primitives of STM library 14 that are callable by transactions 20 may include management primitives that implement start, commit, abort, and retry functions in STM library 14. A transaction 20 calls the start function to initiate the management of the transaction 20 by STM library 14. A transaction 20 calls the commit function to finalize the results of the transaction 20 in memory system 204, if successful. A transaction 20 calls the abort function to roll back or undo the results of the transaction 20 in memory system 204. A transaction 20 calls the retry function to retry the transaction 20. In other embodiments, some or all of the functions performed by STM library 14 may be included in runtime environment 16 or added to transactions 20 by a compiler such as compiler 92 shown in FIGS. 4 and 5.

The STM primitives of STM library 14 that are callable by transactions 20 also include memory access primitives that manage accesses to objects 30 that are written and/or read by a transaction 20. The memory access primitives access a set of one or more transactional locks 39 for each object 30. In one embodiment, STM system 10 uses the object header of objects 30 to store the corresponding transactional locks 39. Each transactional lock 39 indicates whether a corresponding object 30 or portion of a corresponding object 30 is locked or unlocked for writing and/or reading by transactions 20. When an object 30 is locked for writing, the corresponding transactional lock 39 includes an address or other reference that locates an entry for the object 30 in a write log 34W in one embodiment. When an object 30 is not locked for writing, the corresponding transactional lock 39 includes a version number of the object 30.

For each non-array object 30, the memory access primitives may access a single transactional lock 39 that locks or unlocks the non-array object 30 for writing and/or reading by a transaction 20. For each array object 30, the memory access primitives may access a set of one or more transactional lock 39 where each transactional lock 39 in the set locks or unlocks a corresponding portion of the array object 30 for writing and/or reading. Runtime environment 16 creates and manages the transactional lock(s) 39 for each object 30.

The memory access primitives of STM library 14 generate and manage a set of one or more STM logs 34 for each transaction currently being executed. Each set of STM logs 34 includes a write log 34W and a read log 34R in one embodiment. Each write log 34W includes an entry for each object 30 that is written by a transaction 20 where each entry includes an address of a corresponding object 30, the version number from the transactional lock 39 of the corresponding object 30, and an address or other reference that locates a shadow copy of the corresponding object 30. Each read log 34R includes an entry for each object 30 that is read by a transaction 20 where each entry includes a reference that locates the transactional lock 39 of a corresponding object 30.

STM library 14 performs the following algorithm, or variations thereof, to execute each transaction 20. Each time a transaction 20 is started by a thread of execution, STM library 14 creates and initializes variables used to manage the transaction. STM library 14 then allows the transaction 20 to execute and perform any write and/or read memory accesses to objects 30 as follows.

To access an object 30 for writing, the transaction 20 invokes a memory access primitive that opens the object 30 for writing. STM library 14 acquires a transactional lock 39 corresponding to the object 30 for the transaction 20 if the lock is available. If the object 30 is not available (i.e., the object 30 is locked by another transaction 20), then STM library 14 detects a memory access conflict between the current transaction 20 and the other transaction 20 and may initiate an abort phase of transaction execution to rollback and re-execute the current transaction 20. If the object 30 is locked by the current transaction 20, then STM library 14 has already acquired the transactional lock 39 corresponding to the object 30 for the transaction 20. Once a corresponding transactional lock 39 is acquired, STM library 14 causes each write access 32 to be made to either the object 30 itself or a shadow copy of a corresponding object 30 (not shown) and causes an entry corresponding to the write access 32 to be stored in log 34W. For non-array objects 30, the shadow copy, if used, may be stored in log 34W. For array objects 30, a shared shadow copy, if used, may be stored separately from log 34W.

To access an object 30 for reading, the transaction 20 invokes a memory access primitive that opens the object 30 for reading. If the object 30 is not write locked for an optimistic read access, STM library 14 causes an entry corresponding to the read access to be stored in read log 34R. If the object 30 is not write locked and does not exceed a maximum number of pessimistic reads for a pessimistic read access, STM library 14 acquires a transactional lock 39 for the object 30 if it has not been acquired, increments a pessimistic reader count for the lock 39, and causes an entry corresponding to the read access to be stored in read log 34R. If the object 30 is locked by another transaction 20, then STM library 14 detects a memory access conflict between the current transaction 20 and the other transaction 20 and may initiate the abort phase of transaction execution to rollback and re-execute the current transaction 20. If the object 30 is locked by the current transaction 20, then STM library 14 may cause an entry corresponding to the read access to be stored in read log 34R or set a flag corresponding to the object 30 in write log 34W to indicate that the object 30 was also read. STM library 14 causes a read access 32 that occurs before a designated object 30 has been opened from writing by the transaction 20 to be made directly from the corresponding object 30. STM library 14 causes each read access 32 that occurs after a designated object 30 has been opened for writing by a transaction 20 to be made from either the corresponding object 30 directly or the corresponding shadow copy.

After a transaction 20 finishes executing or re-executing, STM library 14 performs validation and commit phases of transaction execution to ensure that the memory accesses by the transaction 20 did not conflict with the memory accesses by any other transaction 20. STM library 14 performs the validation phase by validating the read accesses of the transaction 20 to confirm that no other transaction 20 wrote a memory location corresponding to a read access of the transaction 20 subsequent to the read access being performed. If STM library 14 detects any memory access conflicts between the current transaction 20 and another transaction 20 during the validation phase, STM library 14 may initiate the rollback phase of transaction execution to rollback and re-execute the current transaction 20.

STM library 14 performs the commit phase by updating any objects 30 that were modified by the transaction 20 with the shadow copies used to store the modifications, releasing any transactional locks 39, and/or storing an updated version number in the transactional locks 39 of any objects 30 that were modified by the transaction 20.

After successfully performing the validation and the commit phases of transaction execution, STM library 14 allows the transaction 20 to complete and allows the thread that caused the transaction 20 to be executed to execute additional transactional or non-transactional code in STM code 12.

STM system 10 implements a lightweight key-based action framework. The framework includes a set of unified application programming interfaces (APIs) exposed by STM library 14 that allow clients (e.g., programmers and/or compilers) to implement actions 40 that can be registered, queried, and updated using specific keys 42 by transactions 20 or transaction nests in STM code 12. Each action 40 includes a key 42, state information 44, and a set of one or more callbacks 46 that can be hooked to the validation, commit, abort, and/or rollback phases of transaction execution. Actions 40 extend the built-in concurrency controls of STM system 10 with customized control logics, support transaction nesting semantics of STM system 10, and enable integration with embodiments of STM system 10 that operate with garbage collection systems. STM system 10 may use the action framework to solve one or more of the STM programming scenarios described below with uniformity and efficiency.

For each transaction 20 that registers an action 40, STM library 14 generates an action map 52 as indicated by an arrow 54. Each action map 52 includes references to the actions 40 registered by STM library 14 in response to action operations 27 from the corresponding transaction 20. STM library 14 registers each action 40 with an associated key 42 that is provided by a transaction 20 as a parameter with an action operation 27 into a corresponding action map 52 for the transaction 20. For transactions 20 that do not provide a key 42 for an action 40 (e.g., transactions 20 that will not query or update the action 40), STM library 14 may register the action 40 with a global shared key 42 to mimic a simple callback add and remove functionality. State information 44 and callbacks 46 in each action 40 may be based on a type of the action operation 27 and/or one or more parameters provided by the transaction 20 with the action operation 27. Action operations 27 may be added to transactions 20 by a programmer or a compiler such as compiler 92 shown in FIGS. 4 and 5.

STM library 14 manages actions 40 in each action map 52 using keys 42 instead of simply queuing actions 40 in a list. By doing so, STM library 14 allows a transaction 20 to query and update the corresponding actions 40 throughout the execution of the transaction 20. Accordingly, state information 44 and callbacks 46 may be modified by the transaction 20. The combination of keys 42, state information 44, and callbacks 46 contained by actions 40 may overcome the limitations of a stateless callback infrastructure that prevent certain STM programming scenarios from being solved. In addition, the use of a single action 40 for each key 42 may allow a transaction 20 to execute with increased efficiency by avoiding adding multiple callback invocations for the same purpose.

In addition to associating per-instances state with transactions 20, STM library 14 may also generate keys 42 that combine instance identifier information with facility identifier information. By doing so, STM library 14 allows registration of multiple actions 40 with the same facility or across different facilities and provides for disambiguation between actions 40 that use object addresses as keys 42 for different purposes (e.g., shadow copy management and monitor lock management). In addition, STM library 14 prevents one facility from accessing the state (i.e., the action 40) maintained by a different facility. As a result, the action framework of STM library 14 may be exposed to users in a secure manner.

Figure 2:
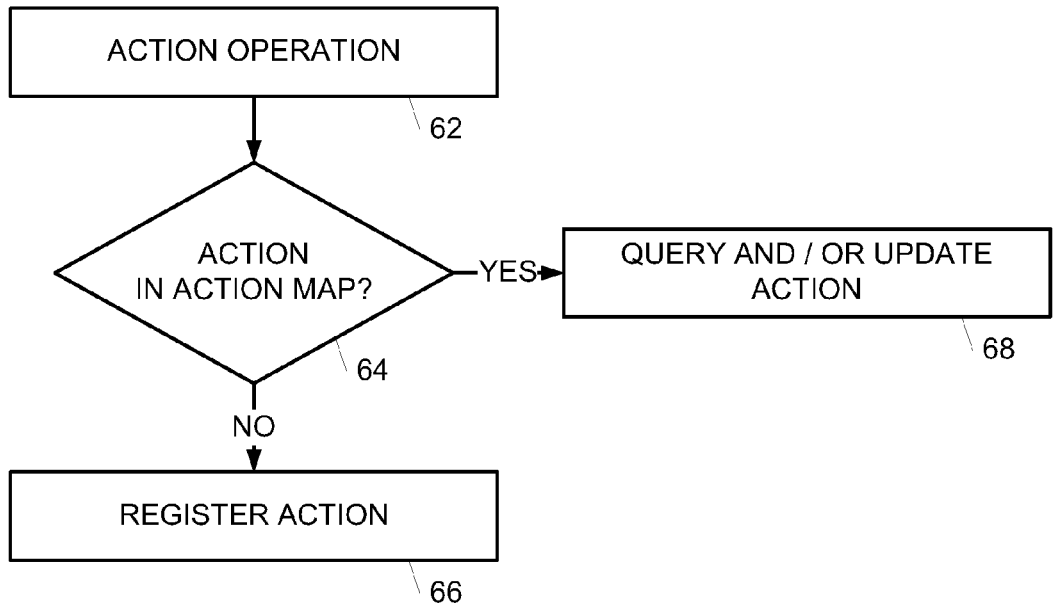
FIG. 2 is a flow chart illustrating an embodiment of a method for querying, registering, and updating an action in an STM system.

FIG. 2 is a flow chart illustrating an embodiment of a method for querying, registering, and updating an action 40 in STM system 10. In response to an action operation 27 from a transaction 20 as indicated in a block 62, STM library 14 registers a new action 40 with a key 42, state information 44, and callbacks 46 in an action map 52 for the transaction 20 if an action 40 with the associated key 42 is not found in action map 52 as indicated by blocks 64 and 66. If an existing action 40 with the associated key 42 is found in action map 52, STM library 14 may return the existing action 40 to the transaction 20 for querying and/or update the state information 44 and callbacks 46 in the action 40 based on one or more parameters provided by the transaction 20 with the action operation 27 as indicated by blocks 64 and 68.

Figure 3:
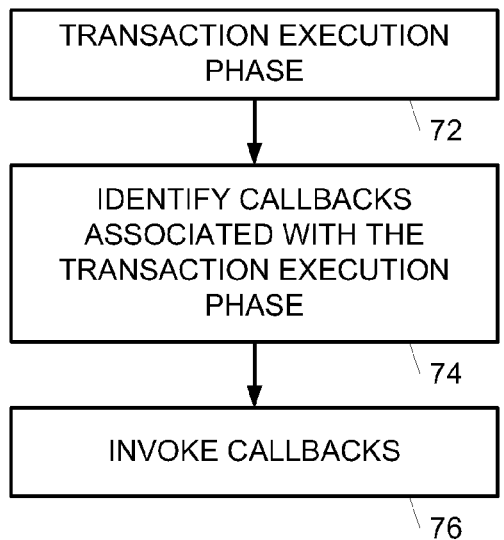
FIG. 3 is a flow chart illustrating an embodiment of a method for invoking a callback implemented by an action at a transaction execution phase.

STM system 14 accesses the action map 52 for a transaction 20 at each phase of transaction execution of the transaction 20 to identify actions 40 with callbacks 46 associated with the transaction execution phases. FIG. 3 is a flow chart illustrating an embodiment of a method for invoking a callback 46 implemented by an action 40 at a transaction execution phase. In response to reaching a transaction execution phase for a transaction 20 as indicated in a block 72, STM library 14 identifies each action 40 in the action map 52 of the transaction 20 with callbacks 46 associated with the transaction execution phase as indicated in a block 74. STM library 14 invokes the callbacks 46 for the transaction execution phase, if any, for each action 40 in the action map 52 as indicated in a block 76.

The action framework APIs of STM library 14 provide three types of callbacks that allow transactions 20 to hook into STM system 10. The callbacks include transaction stage callbacks, nesting integration callbacks, and resource management and garbage collection integration callbacks. Each action 40 provides a customized implementation of these callbacks if specific behaviors are desired.

In one embodiment, the transaction stage callbacks include OnPrepareForCommit, OnCommit, and OnRollback. The OnPrepareForCommit callback occurs during the validation phase of a transaction 20. During the validation phase, STM library 14 detects any actions 40 that implement the OnPrepareForCommit callback 46 and invokes any such callbacks 46. The OnPrepareForCommit callback 46 allows a transaction 20 to participate in the validation process that determines whether a transaction 20 commits or rolls back and re-executes. The OnCommit callback 46 occurs during the commit phase. During the commit phase, STM library 14 detects any actions 40 that implement the OnCommit callback 46 and invokes any such callbacks 46. The OnRollback callback 46 occurs during the rollback phase when a transaction 20 aborts or rolls back for re-execution. When a transaction 20 reaches an abort or roll back point, STM library 14 detects any actions 40 that implement the OnRollback callback 46 and invokes any such callbacks 46. In other embodiments, the transaction stage callbacks may include other callbacks 46 related to different phases of execution of transactions 20.

The action framework of STM library 14 includes built-in support of nesting semantics of actions 40. Transactions 20 may provide a SearchParent parameter with an action operation 27 to specify whether the current action 40 is to be associated with the innermost nested transaction 20 that is currently active or with the whole transaction nest. The close integration with the transaction nesting hierarchy may provide greater flexibility and expressiveness to transactions 20 that implement actions 40. Accordingly, transactions 20 may choose either flat or nesting semantics for their actions 40.

In one embodiment, the nesting integration callbacks include DeferToParentOnCommit, DeferToParentOnAbort, MergeToParent, and SurviveOnRollback callbacks 46. The DeferToParentOnCommit and DeferToParentOnAbort callbacks 46 allow nested transactions 20 to specify whether an action 40 is to be deferred to a parent transaction 20 when committing (DeferToParentOnCommit) or aborting (DeferToParentOnAbort) the nested transactions 20. For actions 40 that are deferred to a parent transaction 20, STM library 14 registers or updates a corresponding action 40 in the action map 52 of the parent transaction 20. The MergeToParent callback allows a nested transaction 20 to specify how to merge the state of an action 40 into an action 40 with the same key 42, if any, in the action map 52 of the parent transaction 20. The SurviveOnRollback callback 46 causes an action 40 to be maintained, rather than deleted, in action map 52 when a transaction 20 rolls back. In other embodiments, the nesting integration callbacks may include other callbacks 46 related to nested transactions 20.

For embodiments of STM system 10 that work with languages powered by garbage collection, such as C# or Java, garbage collection integration with STM library 14 ensures correctness. If STM system 10 holds a reference to a memory location that is managed by the garbage collector, STM system 10 reports the reference to the garbage collector so that the reference can be updated correctly during garbage collections. Because actions 40 may hold managed references, STM library 14 provides garbage collection hooks to let actions 40 report any references to the garbage collector.

In one embodiment, the resource management and garbage collection integration callbacks include Release and OnGCScan callbacks 46. The Release callback 46 occurs during the commit phase where STM library 14 to allow a transaction 20 to release a resource. The OnGCScan callback 46 occurs during garbage collection to allow STM library 14 to report references in actions 40 to the garbage collector. In other embodiments, the resource management and garbage collection integration callbacks may include other callbacks 46 related to resource management and garbage collection.

STM library 14 uses the action framework to solve one or more STM programming scenarios such as supporting the use of thread local memory in transactions 20, providing interoperation between transactional and traditional locks, supporting static class initializers and modular initializers in transactions 20, allowing for software lock elision inside transactions 20, and providing a customized abstract concurrency control.

By definition, thread local memory (i.e., local variables, thread static fields, etc.) will only be accessed by an owning thread. Accordingly, thread local memory may be managed without using the standard STM memory concurrency control logics of STM library 14 (e.g., logs 34). To support failure atomicity, however, STM library 14 backs up the initial values of any thread local memory used by a transaction 20 so that the initial values can be recovered if the transaction 20 does not succeed (i.e., rolls back or is aborted). STM library 14 handles pointer-to-locals (including struct types) across method boundaries by combining with byref analysis.

STM library 14 may be configured to implement a memory undo action 40 using the action framework to handle thread local memory accesses by transactions 20. For each thread local memory region, the memory undo action 40 caches the initial values of the thread local memory region if the region may be modified and recovers the initial values in case the transaction 20 is rolled back or aborted. The memory undo action 40 uses the base address of the thread local memory region as the key 42. By doing so, STM library 14 can register a single memory undo action 40 per thread local memory region and perform a single undo action per thread local memory region if a transaction 20 does not succeed. As a result, STM library 14 may handle thread local memory accesses without registering multiple actions 40 for the same thread local memory region. STM library 14 implements the memory undo action 40 with a per transaction scope and does not merge memory undo actions 40 into parent transactions 20. Each transaction 20 registers a set of memory undo actions for accessed local memory regions before the transaction 20 starts. This allows for partial rollback of thread local memory when a nested transaction 20 rolls back or aborts.

STM library 14 may be also configured to provide interoperation between transactional and traditional locks using the action framework. By doing so, STM library 14 may provide increased compatibility and composability between STM system 10 and any non-transactions code in STM code 12. To provide isolation between transactions 20 and non-transactional code in STM code 12, STM library 14 registers a lock interoperation action 40 to cause a transaction 20 to hold each lock 39 taken by the transaction 20 until the whole transaction nest that includes the transaction 20 commits successfully. The lock interoperation action 40 causes the locks 39 to be held even if there are unlock operations inside the transaction 20 or transaction nest. Because STM library 14 uses a key 42 to query each lock interoperation action 40 and the lock releases are deferred until the whole transaction nest commits successfully, the lock interoperation action 40 allows a single physical lock operation to be performed for each lock 39 in a transactional nest. STM library 14 updates lock interoperation actions 40 to maintain a lock and unlock recursion count to allow lock operations to be compensated when a transaction 20 aborts or a transaction nest commits. STM library 14 implements lock interoperation actions 40 with a per transaction scope but merges lock interoperation actions 40 to any parent transaction 20 upon abort or commit.

When a transaction 20 with one or more lock interoperation actions 40 commits, STM library 14 performs the deferred lock operations based on the recursion count to correctly set the state of the locks 39. If a transaction 20 with one or more lock interoperation actions 40 aborts, STM library 14 compensates for any acquired locks by performing corresponding lock release operations for each acquired lock. Because lock releases are deferred until the transaction nest commits, STM library 14 ignores any lock releases when a transaction 20 aborts.

Additional details of the use of lock interoperation actions 40 may be found in U.S. patent application Ser. No. 12/819,499, which is entitled "COMPOSITION OF LOCKS IN SOFTWARE TRANSACTIONAL MEMORY", filed concurrently herewith, and is incorporated by reference in its entirety.

In addition, STM library 14 may be configured to support static class initializers and modular initializers in transactions 20 using the action framework. In systems such as Microsoft-.NET or the Java Virtual Machine, only one thread is allowed to perform the static class initialize of a particular class or the modular initialize of a module. To avoid potential data races in such initializations, STM library 14 registers an initializer action 40 whenever an initializer is encountered in a transaction 20 and immediately rolls back and re-executes the transaction 20. The initializer action 40 implements the OnRollback callback 46 which is invoked when STM library 14 rolls back the transaction. The OnRollback callback 46 for the initializer action 40 performs the intended initialization prior to the transaction being re-executed. The initializer action 40 has a transaction nest scope, i.e., the whole transaction nest only has a single initializer action 40 per initializer.

STM library 14 may further use the action framework to allow software lock elision inside transactions 20. Software lock elision is an optimization technique that relies on the assumption that no contention will occur on lock operations (e.g., read and write locks on objects 30) most of the time. For each lock operation of a transaction 20, STM library 14 registers a lock elision action 40 that captures the current state of the lock 39 of an object 30 and speculatively executes the transaction 20 without actually locking the object 30. During the validation phase, STM library 14 invokes the OnPrepareForCommit callback 46 for each lock elision action 40 to determine whether the corresponding locks 39 have changed. If any locks 39 have changed, STM library 14 causes the transaction 20 to roll back and re-execute. STM library 14 implements lock elision actions 40 with a per transaction scope but merges lock elision actions 40 to any parent transaction 20 upon abort or commit.

STM library 14 may also use the action framework to provide programmers with a customized abstract concurrency control. At times, conflicts detected by STM library 14 of low level reads and writes may be false conflicts. For example, in a chain-based hash table, an insertion operation touches a bucket header and entries in a linked list along the way to the appropriate position in the hash table. The insertion operation will conflict with any transaction 20 that updates the bucket or any of the entries even though semantically disjoint entries are actually being accessed. To avoid such false conflicts, programmers can forgo the low level memory concurrency control offered by STM library 14 (e.g., by suppressing the concurrency controls or by using open nesting) and manage their data structures using a high level abstract concurrency control provided by the action framework.

STM library 14 implements one or more customized control actions 40 to allow programmers to provide customized concurrency control algorithms with the callback information 46. The customized control actions 40 may use the OnPrepareForCommit callback 46 to influence the decision of whether a transaction 20 can be committed or not, the OnCommit callback 46 to flush out any deferred effects that are held off in a transaction 20, and the OnRollback callback 46 to provide any compensating actions. If nesting semantics are desired, the DeferToParentOnCommit, DeferToParentOnAbort, MergeToParent, and SurviveOnRollback callback information 46 may be used to express the desired behaviors.

Figure 4:
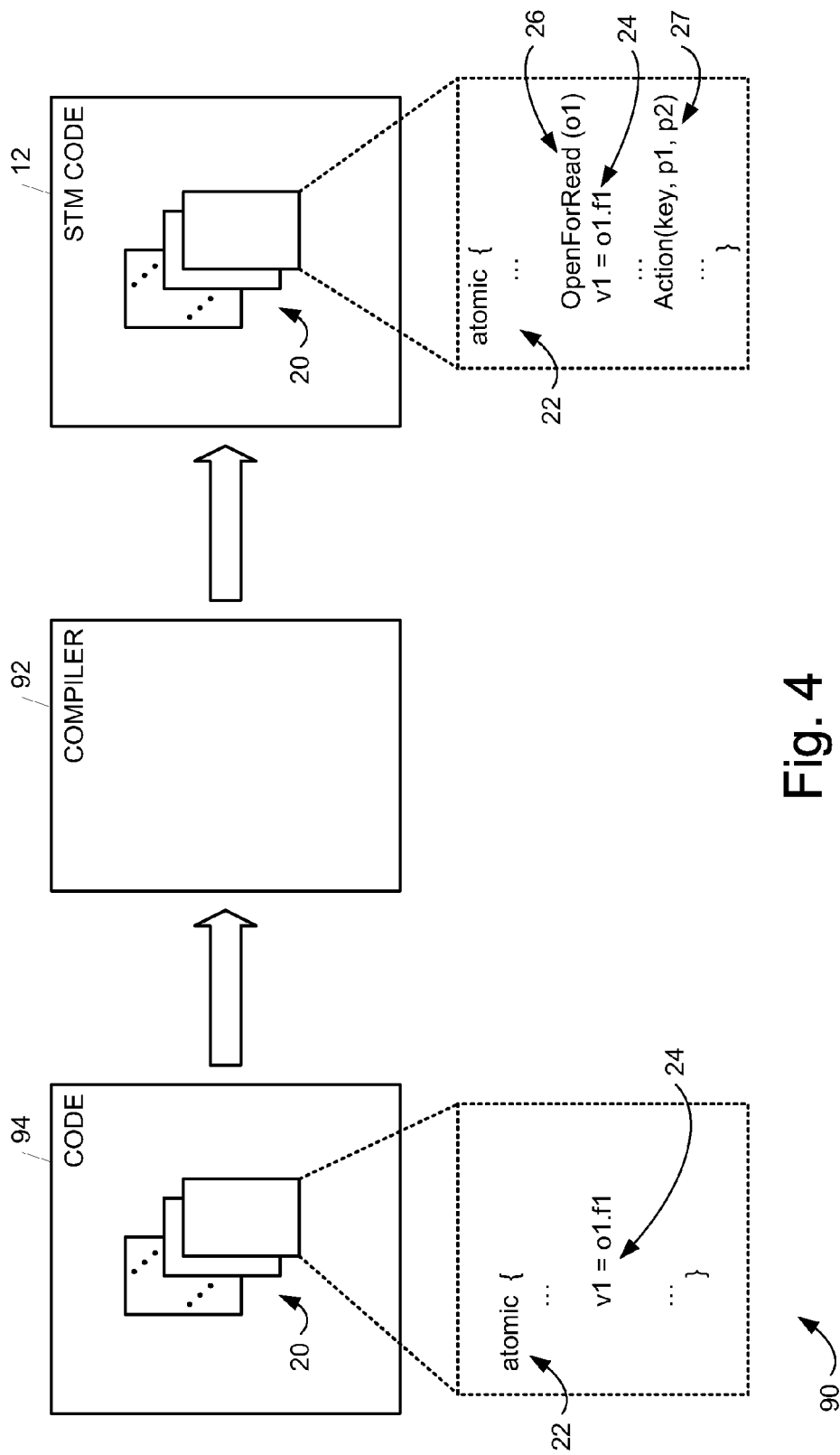
FIG. 4 is a block diagram illustrating an embodiment of a compiler system with a compiler that is configured to compile source code with software transactional memory transactions.

FIG. 4 is a block diagram illustrating an embodiment of a compiler system 90 with a compiler 92 that is configured to compile source code 94 with STM transactions 20.

Compiler system 90 represents a compile mode of operation in a computer system, such as computer system 100 shown in FIG. 5 and described in additional detail below, where the computer system is executing instructions to compile code 94 into STM code 12. In one embodiment, compiler system 90 includes a just-in-time (JIT) compiler system that operates in the computer system in conjunction with a runtime environment executed by an operating system (OS), such as OS 122 shown in FIG. 5 and described in additional detail below, STM library 14, and any additional runtime libraries (not shown). In another embodiment, compiler system 90 includes a stand-alone compiler system that produces STM code 12 for execution on the same or a different computer system.

Code 94 includes a set of one or more STM transactions 20. Each STM transaction 20 includes an atomic block designator 22 that indicates to compiler 92 that a corresponding portion of code 94 is an STM transaction 20. Each STM transaction 20 may include zero or more memory accesses 24 that read from and/or write to an object 30. Each STM transaction 20 may also include zero or more action operations 27 (not shown) that generate, query, or update actions 40. Code 94 may be any suitable source code written in a language such as Java or C# or any suitable bytecode such as Common Intermediate Language (CIL), Microsoft Intermediate Language (MSIL), or Java bytecode.

Compiler 92 accesses or otherwise receives code 94 with transactions 20 that include memory accesses 24. Compiler 92 identifies memory accesses 24 and compiles code 94 into STM code 12 with invocations 26 of STM primitives in STM library 14 for each memory access 24. Compiler 92 may also identify instances where an action 40 may be used and compiles code 94 into STM code 12 with action operations 27 for each instance where an action 40 may be used. Compiler 92 performs any desired conversion of the set of instructions of code 94 into a set of instructions that are executable by a designated computer system and includes the set of instructions in STM code 12.

Figure 5:
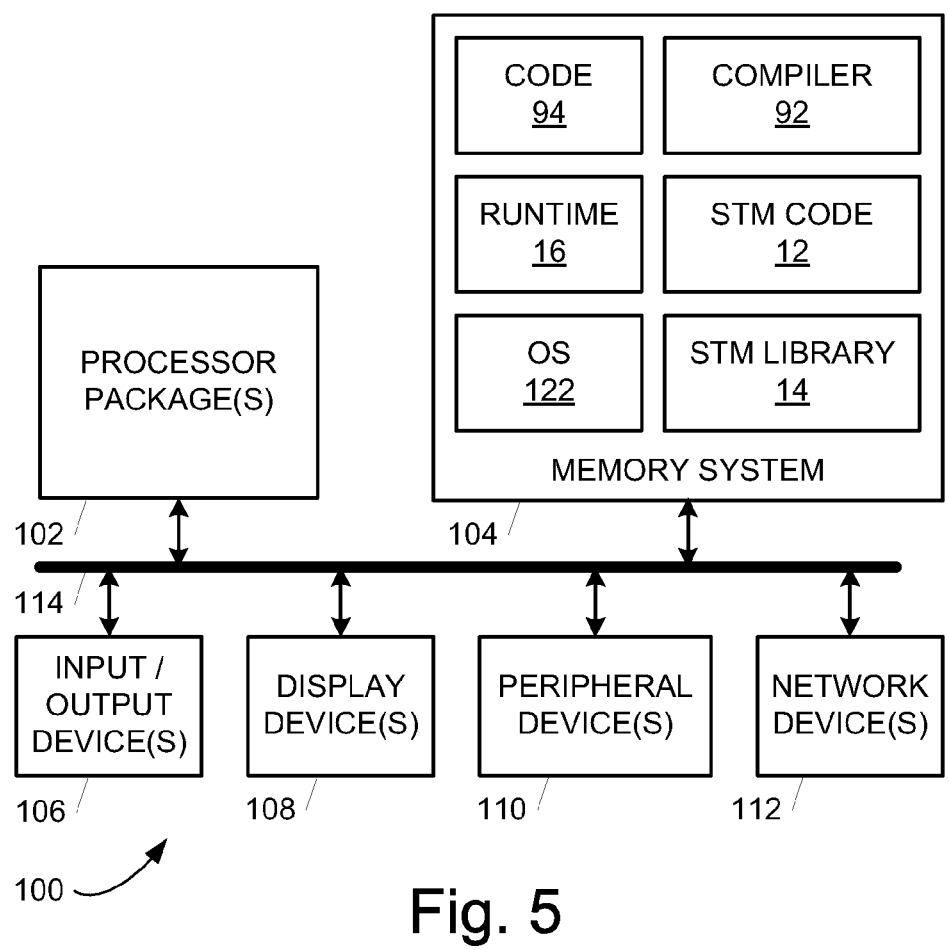
FIG. 5 is a block diagram illustrating an embodiment of a computer system configured to implement a software transactional memory system.

FIG. 5 is a block diagram illustrating an embodiment of a computer system 100 configured to implement STM system 10.

Computer system 100 includes one or more processor packages 102, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 104. The instructions may include a basic input output system (BIOS) or firmware (not shown), OS 122, STM code 12, STM library 14, runtime environment 16, compiler 92, and code 94. Each execution core may execute the instructions in conjunction with or in response to information received from input/output devices 106, display devices 108, peripheral devices 110, and/or network devices 112.

Computer system 100 boots and executes OS 122. OS 122 includes instructions executable by execution cores to manage the components of computer system 100 and provide a set of functions that allow programs to access and use the components. OS 122 executes runtime environment 16 to allow STM code 12 and STM library to be executed. In one embodiment, OS 122 is the Windows operating system. In other embodiments, OS 122 is another operating system suitable for use with computer system 100.

Computer system 100 executes compiler 92 to generate STM code 12 from code 94. Compiler 92 accesses or otherwise receives code 94 and transforms code 94 into STM code 12 for execution by computer system 100. Compiler 92 performs any desired conversion of the set of instructions of code 94 into a set of instructions that are executable by computer system 100 and includes the set of instructions in STM code 12. Compiler 92 also identifies blocks 20 in code 94 from transaction designators 22 and modifies blocks 20 in STM code 12 to include invocations of STM primitives 26.

In one embodiment, compiler 92 includes a just-in-time (JIT) compiler that operates in computer system 100 in conjunction with OS 122, runtime environment 16, and STM library 14. In another embodiment, compiler 92 includes a stand-alone compiler that produces STM code 12 for execution on computer system 100 or another computer system (not shown).

Computer system 100 executes runtime environment 16 and STM library 14 to allow STM code 12, and transactions 20 therein, to be executed in computer system 100 as described above.

Memory system 104 includes any suitable type, number, and configuration of volatile or non-volatile storage devices configured to store instructions and data. The storage devices of memory system 104 represent computer readable storage media that store computer-executable instructions including STM code 12, STM library 14, runtime environment 16, OS 122, compiler 92, and code 94. The instructions are executable by computer system 100 to perform the functions and methods of STM code 12, STM library 14, runtime environment 16, OS 122, compiler 92, and code 94 as described herein. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a software transactional memory (STM) system in a computer system, the method comprising:
   receiving, with an action framework in the STM system, a first action operation with a first key from a transaction in STM code, each action includes a key, state information, and a set of one or more callbacks that can be hooked to at least one of validation, commit, abort, and re-execution phases of transaction execution, said each action provides a customized implementation of the one or more callbacks;
   registering, with the action framework, a first action corresponding to the first action operation with the first key, the first key allowing the transaction to subsequently perform at least one of querying and updating the first action and the first action implementing a callback with a customized implementation;
   receiving, with the action framework, a second action operation with a second key from the transaction; and
   in response to the second key differing from the first key, registering, with the action framework, a second action corresponding to the second action operation in a first action map with the second key and a callback implemented by the second action operation.

2. The method of claim 1 further comprising:
   performing at least one of querying and updating the first action in response to the second action operation with the second key from the transaction.

3. The method of claim 1 further comprising:
   invoking the callback in the first action in response to reaching a transaction execution phase corresponding to the transaction.

4. The method of claim 3 wherein the transaction execution phase is one of a validation phase, a commit phase, and a rollback phase.

5. The method of claim 1 further comprising:
generating an action map for the transaction in response to the first action operation from the transaction.

6. The method of claim 1 further comprising:
merging the first action into an action map of a parent transaction of the transaction.

7. The method of claim 1 further comprising:
invoking the callback in the first action in response to a garbage collection.

8. The method of claim 1 wherein the first action is a memory undo action corresponding to thread local memory accessed by the transaction.

9. The method of claim 1 wherein the first action is a lock interoperation action corresponding to a traditional lock accessed by the transaction.

10. The method of claim 1 wherein the first action is an initializer action corresponding to an initialization performed by the transaction that can only be done once and cannot be rolled back.

11. The method of claim 1 wherein the first action is a lock elision action corresponding to a lock elision by the transaction.

12. The method of claim 1 wherein the first action is a customized control action corresponding to a concurrency control algorithm of the transaction.

13. A method performed by a software transactional memory (STM) system in a computer system, the method comprising:
receiving, with an action framework in the STM system, a first action operation with a first key from a transaction in STM code, each action includes a key, state information, and a set of one or more callbacks that can be hooked to at least one of validation, commit, abort, and re-execution phases of transaction execution, said each action provides a customized implementation of the one or more callbacks;
updating, with the action framework, a first action with the first key in a first action map corresponding to the transaction;
receiving, with the action framework, a second action operation with a second key from the transaction; and
in response to the second key differing from the first key, registering, with the action framework, a second action corresponding to the second action operation in the first action map with the second key and a callback implemented by the second action operation.

14. The method of claim 13 further comprising:
invoking a callback implemented by the first action in response to reaching a transaction execution phase corresponding to the transaction.

15. The method of claim 13 further comprising:
merging the first action into a second action map of a parent transaction of the first transaction.

16. A computer readable storage medium, which does not include transitory propagating signals, storing computer-executable instructions that, when executed by a computer system, perform a method comprising:
receiving, with an action framework in a software transactional memory (STM) system in the computer system, a first action operation with a first key from a first transaction in STM code, each action includes a key, state information, and a set of one or more callbacks that can be hooked to at least one of validation, commit, abort, and re-execution phases of transaction execution, said each action provides a customized implementation of the one or more callbacks;
registering, with the action framework, a first action corresponding to the first action operation with the first key if the first action has not been registered when the first action operation is received, the first action implementing a callback with a customized implementation;
performing, with the action framework, at least one of querying and updating the first action in response to the first action operation if the first action has been registered when the first action operation is received;
receiving, with the action framework, a second action operation with a second key from the transaction; and
in response to the second key differing from the first key, registering, with the action framework, a second action corresponding to the second action operation in a first action map with the second key and a callback implemented by the second action operation.

17. The computer readable storage medium of claim 16, the method further comprising:
determining whether the first action has been registered when the first action operation is received using the first key.

18. The computer readable storage medium of claim 17, the method further comprising:
invoking the callback in the first action in response to reaching a transaction execution phase corresponding to the transaction.

19. The computer readable storage medium of claim 18, the method further comprising:
merging the first action into a third action of a second transaction in response to the first transaction committing, the third action being a parent transaction of the first transaction.

* * * * *